United States Patent
Loschke et al.

(10) Patent No.: US 7,844,806 B2
(45) Date of Patent: Nov. 30, 2010

(54) GLOBAL HISTORY BRANCH PREDICTION UPDATING RESPONSIVE TO TAKEN BRANCHES

(75) Inventors: Jon A. Loschke, Austin, TX (US); Timothy A. Olson, Austin, TX (US); Terrence Matthew Potter, Austin, TX (US)

(73) Assignee: Applied Micro Circuits Corporation, San Diego, CA (US)

( * ) Notice: Subject to any disclaimer, the term of this patent is extended or adjusted under 35 U.S.C. 154(b) by 394 days.

(21) Appl. No.: 12/023,303

(22) Filed: Jan. 31, 2008

(65) Prior Publication Data

US 2009/0198984 A1    Aug. 6, 2009

(51) Int. Cl.
    *G06F 9/38* (2006.01)
(52) U.S. Cl. .................................................... 712/240
(58) Field of Classification Search .................. None
    See application file for complete search history.

(56) References Cited

U.S. PATENT DOCUMENTS

| | | | | |
|---|---|---|---|---|
| 6,526,502 | B1* | 2/2003 | Col et al. | 712/239 |
| 7,000,096 | B1* | 2/2006 | Sinharoy | 712/240 |
| 7,404,070 | B1* | 7/2008 | Patil et al. | 712/239 |
| 2002/0194465 | A1* | 12/2002 | Sinharoy | 712/239 |
| 2005/0228977 | A1* | 10/2005 | Cypher et al. | 712/240 |
| 2006/0149951 | A1* | 7/2006 | Abernathy et al. | 712/240 |
| 2008/0059779 | A1* | 3/2008 | Davis et al. | 712/239 |
| 2008/0256347 | A1* | 10/2008 | Eickemeyer et al. | 712/240 |

OTHER PUBLICATIONS

McFarling (Combining Branch Predictors) WRL Technical Note TN-36, Digital Eequipment Corp., Jun. 1993, 29 pages.*
Skadron et al. (Speculative Updates of Local and Global Branch History: A Quantitative Analysis), University of Virgina, 2000, 23 pages.*

* cited by examiner

*Primary Examiner*—Eddie P Chan
*Assistant Examiner*—Keith Vicary
(74) *Attorney, Agent, or Firm*—Law Office of Gerald Maliszewski; Gerald Maliszewski

(57) ABSTRACT

A system and method are provided for updating a global history prediction record in a microprocessor system using pipelined instruction processing. The method accepts a microprocessor instruction of consecutive operations, including a conditional branch operation with an associated branch address, at a first stage in a pipelined microprocessor execution process. A global history record (GHR) of conditional branch resolutions and predictions is accessed and hashed with the branch address, creating a first hash result. The first hash result is used to access an indexed branch history table (BHT) of branch direction counts and the BHT is used to make a branch prediction. If the branch prediction being "taken", the current GHR value is left-shifted and hashed with the branch address, creating a second hash result which is used in creating an updated GHR.

22 Claims, 4 Drawing Sheets

IF - INSTRUCTION FETCH
IC - INSTRUCTION CACHE ACCESS
ID - INSTRUCTION DECODE
RS - REGISTER READ
Sch - SCHEDULE
EX - EXECUTE
WB - WRITE BACK TO REGISTER FILE

SECOND HASHING CIRCUIT 332

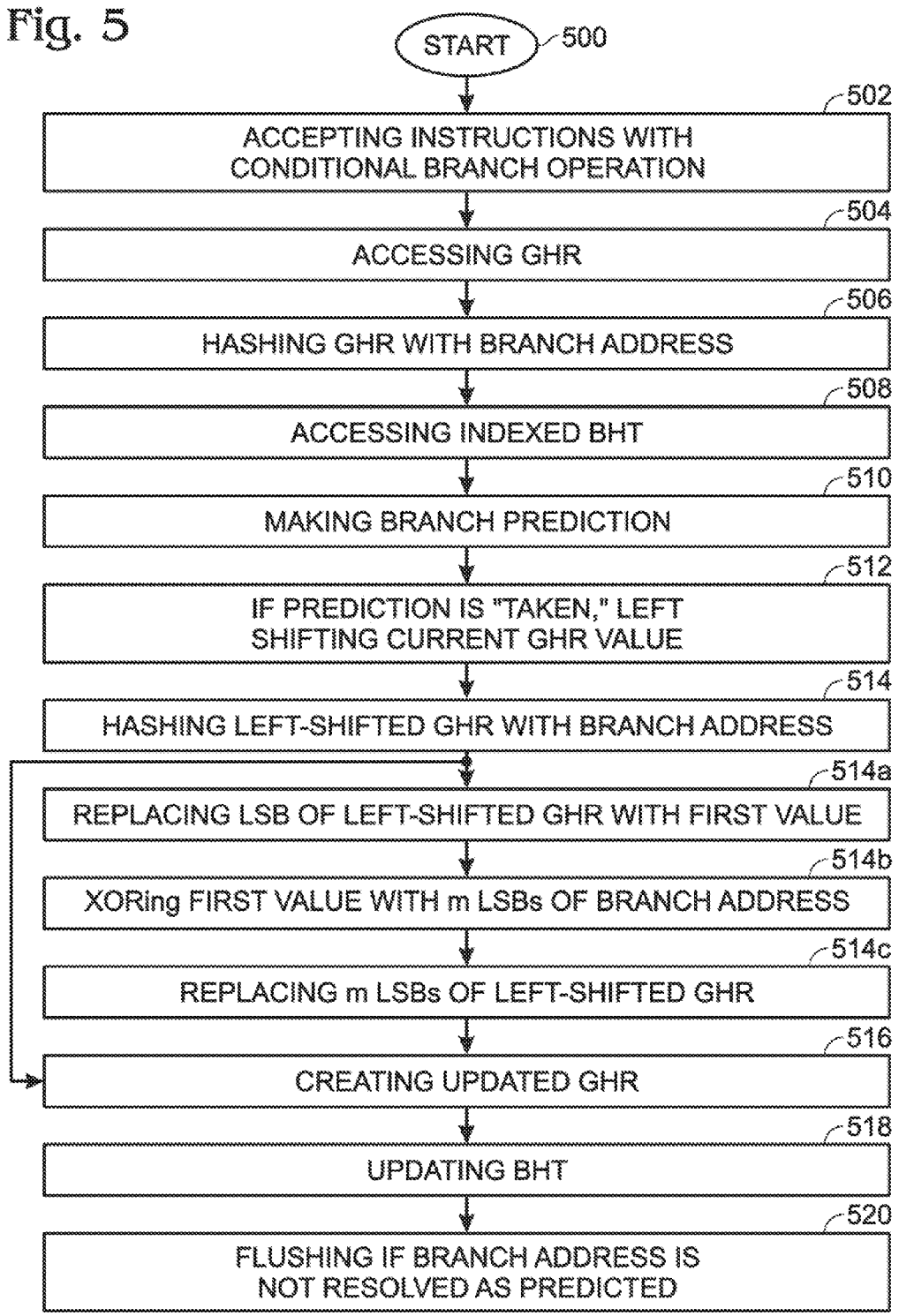

GLOBAL HISTORY BRANCH PREDICTION UPDATING RESPONSIVE TO TAKEN BRANCHES

BACKGROUND OF THE INVENTION

1. Field of the Invention

This invention generally relates to a computer-instruction pipeline and, more particularly, to a system and method for updating global history predictions associated with a pipeline using only "taken" branch predictions.

2. Description of the Related Art

In the central processing units of general purpose computers, micro-architectures have evolved that permit the simultaneous processing of multiple instructions, for the purpose of increasing computational performance. Modern high-performance computers often employ one or more of three techniques to increase performance. Pipelined execution permits instruction execution to be partitioned into a series of sub-operations, each of which requires less time to execute than the entire instruction. Further, multiple instructions can be in different stages of execution, to allow parallel execution of instructions.

Superscalar execution is the technique of providing extra hardware to allow the execution of multiple instructions in parallel in any given stage of the pipeline. Out-of-order execution is a technique that permits many instructions to be in execution, and allows instructions to be executed in an order determined by their data dependencies, rather than the order in which they occur in the program. In general, this process permits instructions that would normally be stalled waiting for earlier instructions to complete, to bypass the "waiting" instructions.

FIG. 1 is a schematic block diagram depicting an exemplary superscalar, out-of-order pipeline (prior art). Instruction execution is divided into a number of stages, and a specific operation occurs in each stage. In the example, instruction fetch occurs in stage 0. To fetch an instruction, a fetch address must be calculated in the Instruction Fetch (IF) stage. This address is used to access the instruction (or multiple instructions, in the case of superscalar machines) from the instruction cache or memory in the IC stage. The instructions are decoded in the ID stage. The register values are read in the RS stage and possibly placed into a structure such as a reservation station to await the availability of other operands. The instructions which are ready for execution are scheduled for execution in the Sch stage. The instruction is actually executed in the EX stage. Finally, the instruction is reordered into program order and committed to the architectural resources in the WB stage. In addition, there may be queues between the stages such as an instruction buffer between the IC and ID stages.

Each stage within the pipeline must occur in order. In order to achieve high performance, one new instruction enters the pipeline every cycle, and each instruction in the pipeline moves to a new stage. Each stage takes inputs and produces outputs, which are stored in an output buffer associated with the stage. One stage's output buffer is typically the next stage's input buffer. Such an arrangement permits all the stages to work in parallel and therefore yields a greater throughput than if each instruction had to pass through the entire pipeline before the next instruction can enter the pipeline. When the pipeline is delayed or has to be cleared, latency is created in the processing of each instruction in the pipeline.

In this type of architecture, many instructions can be "in flight"; that is, in various stages of execution, simultaneously. If a stream of instructions has no branches, the pipeline can be filled and never need to be flushed. The time a program takes to execute is then a function of the number of instructions, and the number of clock cycles each instruction takes to execute. Branch instructions disturb the flow of instructions through the pipeline. A conditional branch instruction includes some condition which, if satisfied, causes the program flow to change. Branch instructions typically have dependencies on other instructions which determine condition. Branch instructions occur roughly every 5-8 instructions in typical programs.

Once a branch instruction is fetched, other instructions are typically fetched from sequential addresses following the branch. If the branch is "taken", the fetch path must be "redirected" to fetch instructions from the branch target address. However, instructions which sequentially followed the branch instruction that have already been fetched, must now be flushed from the pipeline, and new instructions must be fetched. This flushing and filling operation results in "bubbles" in the pipeline in which no work is done, lowering performance.

In order to reduce the number of pipeline bubbles, some architectures use a technique called "branch prediction" in which a conditional branch is predicted to be "taken" or "not taken" before the branch is actually executed. This reduces the delay between the fetching of the branch and the re-direction of the fetch stream. To the extent that the branch prediction is accurate, the pipeline stalls are reduced or eliminated.

One technique for accomplishing branch prediction is called Global History Prediction with Index Sharing or Gshare, for short. The Gshare technique uses a structure called a Branch History Table to store predictors. Each predictor is a counter that is updated when a branch instruction is executed (resolved). If the branch is "taken", the counter is incremented and if it is "not taken", it is decremented. The counter is saturating, such that when it reaches its maximum value, incrementing it again will not change the value and if it reaches its minimum value, decrementing it will not change the value. Typically, the counters are 2 bits in width, though this width is a design choice. The value of the predictor is used to decide if the branch prediction is "taken" or "not taken". The intuition is that if the branch has been "taken" frequently in the near past, then it will be "taken" in the future and vice versa. Given this, if 2 bit counters are used, Table 1 shows the prediction for each value. Each counter has 4 states encoded as 00: strongly "not taken", 01: weakly "not taken", 10: weakly "taken", and 11: strongly "taken". If the BHT tracks a branch as either strongly "not taken" or weakly "not taken", and the branch is resolved "not taken", then the state becomes strongly "not taken".

TABLE 1

Predictor value meaning

| Counter value | Prediction |
| --- | --- |
| 00 | Strongly NOT Taken |
| 01 | Weakly NOT Taken |
| 10 | Weakly Taken |
| 11 | Strongly Taken |

The BHT is indexed by a number which is formed by hashing the address of the branch instruction with the value in the Global History Shift Register (GHSR) or Global History Register (GHR). If the BHT contains $2^N$ predictors, N bits are needed to select a predictor.

FIG. 2 is a schematic block diagram depicting a Gshare scheme for indexing a BHT (prior art). The GHSR is a shift register of M bits, where M is usually less than N. When a branch instruction is executed, the decision to take the branch or not is made and the branch is said to be "resolved". When the branch is resolved, the value in the GHSR is updated by shifting in a 1 if the branch is taken and a 0 if the branch is not taken. The effect is to form a pattern of 1's and 0's which reflect the directions taken by the M most recent branches. This number is combined with the branch address, typically lower order address bits are exclusive-ORed (XOR'd) with the GHSR, to form the N-bit index. This index is then used to select the predictor in the BHT.

Processor micro-architectures with extremely long pipelines which allow many instructions in flight have a problem caused by the fact that there may be many branch instructions fetched and placed in the instruction queue, which have not yet been identified as branches and predicted. This is the fetch-to-re-direct delay and arises due to the following problem. The type of the instruction is not known until it reaches the decode stage (ID). Further, the branch is not resolved until it reaches the EX stage, when it is executed. This leads to two problems which arise when implementing the Gshare branch prediction scheme:

1. the latency between the instruction fetch stage and the branch prediction stage causes a delay in the time between when the branch prediction is made and the time when a new address is available for the fetch stage; and, 2. the latency between the branch prediction stage and the branch resolution stage causes a delay in the update of the GHSR.

The first problem is solved by ensuring that branches are always fetched using the correct GHSR value, which is accomplished by updating the GHSR on "taken" branches and flushing pre-fetched instructions in the event of redirection. The second problem is solved by speculatively updating the GHRS. The newly-created problem of having a "bad" GHSR responsive to the mis-prediction is solved by "repairing" the GHSR with a non-speculative value being tracked during branch resolution.

In the conventional Gshare scheme, the GHSR is used to form an index into the BHT by shifting in a value of one if the branch is "taken" and a value of zero if the branch is "not taken". Thus, the GHSR is updated on every branch, whether "taken" or "not taken". However, there is a problem that arises if there are multiple instructions in the pipeline between the fetch stage and the branch prediction stage, and the GHSR is updated on every branch. For every branch that is in the pipeline between these stages, the GHSR value is the same. That is, the value is updated in the prediction stage, and if the branch is predicted to be "taken", the branches that follow it will use the same GHSR value in their predictions. This means that if a branch is "not taken", each fetch from the time the branch is fetched until the update, uses incorrect data to look up entries in the BHT.

It would be advantageous if the amount of incorrect prediction information loaded into a GHR could be minimized.

SUMMARY OF THE INVENTION

The solution to the above-mentioned problem of using incorrect GHR data to look up entries in the BHT is addressed in the present invention. The present invention is a method that prevents updating the GHR with incorrect data by updating the GHR only on "taken" branches. Since a "taken" branch forces a re-direct of the fetch stream and a flush of all instructions earlier in the pipeline, the BHT can also be re-accessed at that time and the predictor will be based on correct branch directions. In one aspect, the GHR is shifted by one bit and two low order bits of the branch address are exclusive-ORed into the register to form the new, updated GHR. This updated GHR provides some information associated with the specific branch (lower address bits) and preserves the value of the GHR on "not taken" branches so that any BHT entries fetched will be correct. Since the GHR is only updated on "taken" branches if the branch is mispredicted, all the instructions are flushed and the GHR is restored to its correct value in the "repair" stage.

Accordingly, a method is provided for updating a global history prediction record in a microprocessor system using pipelined instruction processing. The method accepts a microprocessor instruction of consecutive operations, including a conditional branch operation with an associated branch address, at a first stage in a pipelined microprocessor execution process. A global history record (GHR) of conditional branch resolutions and predictions is accessed and hashed with the branch address, creating a first hash result. The first hash result is used to access an indexed branch history table (BHT) of branch direction counts and the BHT is used to make a branch prediction. If the branch prediction being "taken", the current GHR value is left-shifted and hashed with the branch address, creating a second hash result which is used in creating an updated GHR.

More explicitly, the second hash result is created by left shifting the current GHR value and replacing the least significant bit (LSB) with a first value. The first value is XOR'd with the m least significant bits of the first branch address, creating the first result. The m LSBs of the left-shifted GHR are then replaced with the first result.

Additional details of the above-described method and a pipelined instruction microprocessor system with a global history prediction record are provided below.

BRIEF DESCRIPTION OF THE DRAWINGS

FIG. 5 is a flowchart illustrating a method for updating a global history prediction record in a microprocessor system using pipelined instruction processing.

DETAILED DESCRIPTION

Figure 1:
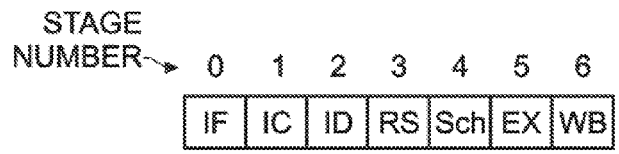
FIG. 1 is a schematic block diagram depicting an exemplary superscalar, out-of-order pipeline (prior art).
Figure 2:
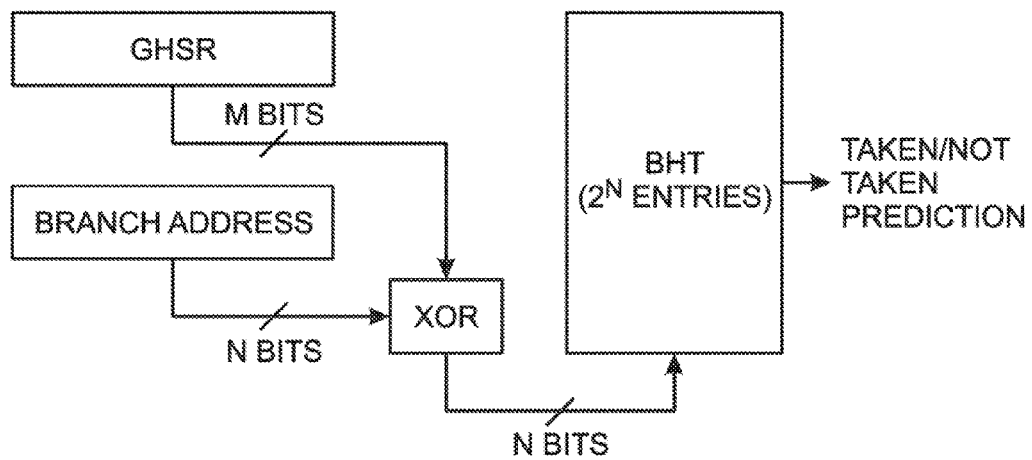
FIG. 2 is a schematic block diagram depicting a processor pipeline (prior art).

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 3:
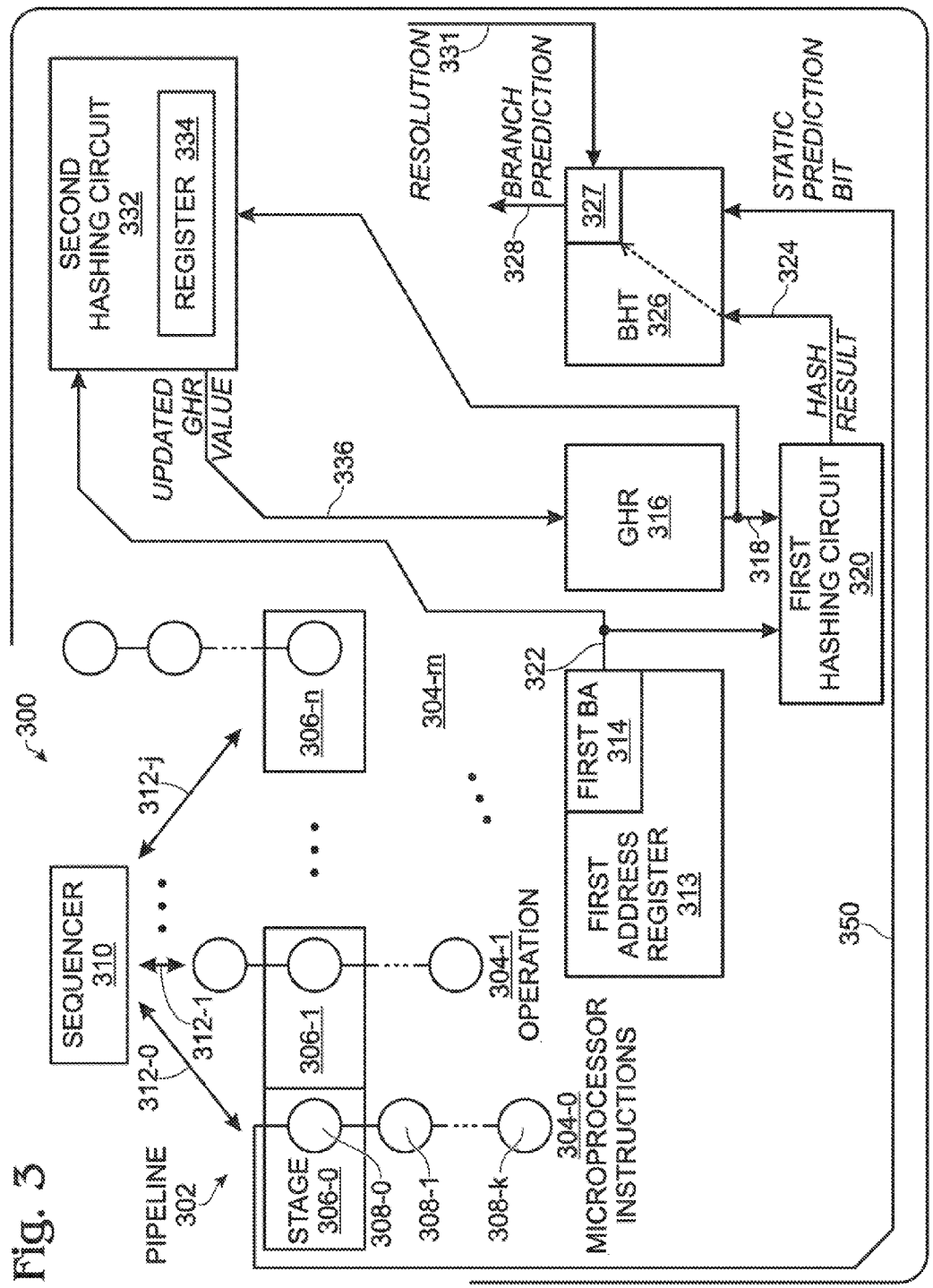
FIG. 3 is a schematic block diagram depicting a pipelined instruction microprocessor system with a global history prediction record.

FIG. 3 is a schematic block diagram depicting a pipelined instruction microprocessor system with a global history prediction record. The system 300 comprises a pipeline 302 including a plurality of sequential stages for parallel processing microprocessor instructions. Microprocessor instructions 304-0 through 304-$m$ are depicted, where m is not limited to any particular value. Stages 306-0 through 306-$n$ are depicted, where n is not limited to any particular number. For example, FIG. 1 depicts a pipeline example where n=6. Returning to FIG. 3, in some aspects n=m. Each microprocessor instruction includes a plurality of consecutive operations. Microprocessor instruction 304-0 is depicted as including operations 308-0 through 308-$k$, where k is not limited to any particular value. Although not explicitly labeled with a reference designator, microprocessor instructions 304-1 through 304-$m$ likewise include a plurality of operations depicted as circular elements. In some aspects, the number of operations in a microprocessor instruction equals the number of stages 306 in pipeline 302. The pipeline 302 includes one or more stages for processing a conditional branch operation. For example, first stage 306-0 may process a first conditional branch operation 308-0 from a first microprocessor instruction 304-0.

A sequencer 310 has an interface on line 312 (312-0 through 312-$j$) for accessing the pipelined stages and processing the operations. For example, sequencer 310 may be a block in a computer processor such as a reduced instruction set computer (RISC). A first address register 313 contains a first branch address (BA) 314 associated with the first conditional branch operation 308-0. Also shown is a global history record (GHR) 316, which has an output on line 318 to supply a current GHR value, which is a history of conditional branch resolutions and predictions. Typically, the global history record 316 is a shift register. The GHR 316 is updated if the first branch prediction is "taken", as explained in more detail below. A first hashing circuit 320 has an input on line 318 to accept the current GHR value, an input on line 322 to accept the first branch address, and an output on line 324 to provide a first hash result. In one aspect the hashing circuit 320 performs an exclusive-OR (XOR) operation between a number representing the current GHR value on line 318 and a number representing the first branch address on line 322. However, other types of hashing are also known in the art.

A branch history table (BHT) 326 has an input on line 324 to accept the first hash result. The BHT 326 indexes a first branch direction counter 327 associated with the first hash result and provides a first branch prediction on line 328. In one aspect, the BHT 326 includes a count of the n-most recent first branch resolutions. The BHT 326 increments the count in response to the first branch instruction being "taken" and decrements the count in response to the first branch instruction being "not taken". This example assumes that higher value counts are associated with "taken" predictions and lower value counts are associated with "not taken" predictions.

Returning to FIG. 3, in one aspect the BHT 316 clamps the count to a maximum value of $m=2^n-1$, and clamps the count to a minimum value of zero. Thus, the BHT first branch prediction indicates a degree of confidence in the assumption that the first branch is "taken". It is also typical for the BHT 326 to be updated with a count associated with the first branch resolution on line 331. Thus, the BHT first branch prediction degree of confidence is modified in response to updating the BHT with the first branch resolution on line 331. Alternately, the BHT may be updated with predictions, which are corrected after the branch is resolved.

In one aspect of the system, each branch is associated with a "static" branch prediction bit in the instruction itself. The compiler software sets the static bit such that the hardware elements in the system (not shown) can determine the most likely branch direction. That is, if there is no other branch prediction help, hardware elements in the system may use the static branch prediction. Then, the use of branch prediction hardware may result in a BHT that produces "agree" or "disagree" decisions that apply to the static prediction bit. If the static prediction bit is "taken" and if the BHT "agrees", then the prediction is correct. If the BHT "disagrees" then the prediction is incorrect, and the branch is said to be mis-predicted. In this case, the pipeline is flushed of all instruction on the mis-predicted path. Likewise, if the static branch prediction is "not taken" and the BHT "agrees", then the branch prediction is correct. If the BHT disagrees, the prediction was incorrect, the branch is mis-predicted.

In this aspect, the pipeline first stage 306a processes a first conditional branch operation 308a having a static prediction bit. The BHT 326 compares the first branch prediction with the static prediction bit received on line 350. The BHT 326 uses the static prediction bit as the first branch prediction if the first branch prediction agrees with the static prediction bit. However, the BHT 326 uses a static prediction bit opposite value (the static prediction bit is flipped) as the first branch prediction if the first branch prediction disagrees with the static prediction bit. Alternately stated, the predictions will either "agree" or "disagree" with the static branch bit or static prediction bit. If the prediction is "agree", then the fetch is performed in accordance with the static branch bit (either "take" or "not take"). If the prediction is "disagree", then the fetcher is the opposite of what the static branch bit reads.

A modification to the conventional Gshare process helps insure that the BHT access is deterministic. There is potential for variability due to several factors: the instruction buffer depth, the fact that the BHT updates non-speculatively, and the discrepancy between fetch bandwidth and prediction bandwidth. This variability leads to the possibility that one or more branches in the pipeline have not yet been predicted. Therefore, a conventional Gshare, which is a simple concatenation of "taken"/"not taken" bits, has some number of speculative bits. This result can lead to indexing a different BHT entry for the next branch than would have happened under circumstances of a different fetch rate. This result is not fatal, but it does decrease the effectiveness of the prediction mechanism.

To improve this result, the GHR can be built using address bits of "taken" branches. This preserves the path-based nature of the history, and effectively ignores "not taken" branches. The "not taken" branches account for all of the variability since any "taken" branches which have not yet been predicted are effectively mispredicted and, thus, new fetches are flushed anyway. Because only "taken" branches are used, the number of branches can actually span more branch history. To further improve performance, the bits can be packed by shifting once and XORing the new bits onto the bottom.

A second hashing circuit 332 has a register 334 to accept the current GHR value on line 318 in response to a first branch prediction of "taken". The second hashing circuit 332 left-shifts the current GHR value, hashing the left-shifted GHR with the first branch address to create a second hash result, and supplying the second hash result to the GHR 316 as an updated GHR value on line 336. As explained in more detail below, the second hash circuit 332 performs an XOR operation between a number representing the left-shifted global history record and a number representing the first branch address.

In one aspect, the pipeline 302 accepts the first microprocessor instruction at a fetch stage (e.g., Stage 0 in FIG. 1). In this aspect, the GHR 316 is a speculative GHS (SGHR). In another aspect, the pipeline 302 accepts the first microprocessor instruction at a branch resolution or execute stage (e.g., Stage 5 in FIG. 1), and the GHR 316 is a non-speculative GHS. Additional details of speculative and non-speculative GHRs are provided in pending application Ser. No. 11/985,025, entitled SYSTEM AND METHOD FOR SPECULATIVE GLOBAL HISTORY PREDICTION UPDATING, which is incorporated herein by reference. Although not specifically shown, the system of FIG. 3 may include both a speculative GHR, which is accessed when branch instructions are fetched, and a non-speculative GHR, which is accessed when branch instructions are executed. Alternately stated, the GHR updating process disclosed herein is applicable to both types of GHRs.

Regardless of the type of GHR, when the pipeline 302 accepts the first microprocessor instruction at an execute stage (e.g., Stage 5 in FIG. 1), and the first branch prediction is resolved as "not taken", the pipeline flushes microprocessor instructions accepted subsequent to the first microprocessor instruction and processed using the first branch prediction of "taken". Likewise, an equivalent flushing process occurs if the branch is predicted "not-taken" and later resolved to "taken".

Figure 4:
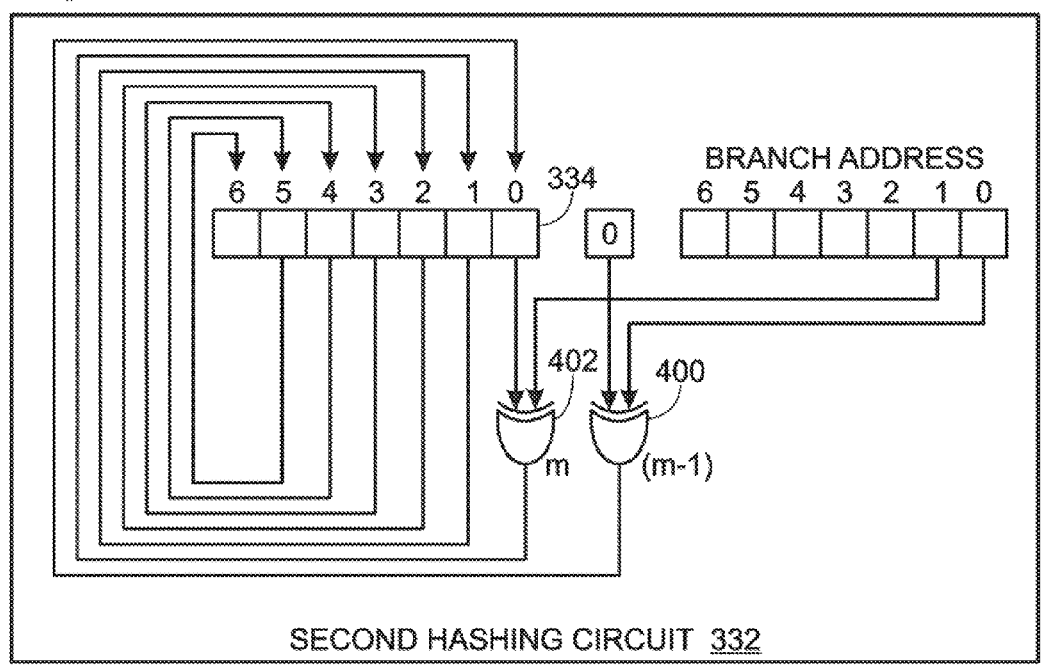
FIG. 4 is a schematic block diagram depicting the second hashing unit of FIG. 3 in greater detail.

FIG. 4 is a schematic block diagram depicting the second hashing unit of FIG. 3 in greater detail. The second hash circuit 332 left shifts the current GHR value in the register 334, replaces the least significant bit (LSB) with a first value. In this example, the first value is a zero. The second hashing circuit 332 XORs the first value with the m LSBs of the first branch address to create a first result. The first result replaces the m LSBs in register 334 to create the updated GHR. In this example, m=2 and XOR gates 400 and 402 are shown.

In another example (not shown)—if m was equal to 3, a third XOR gate would be used to accept LSB-2 from the branch address, LSB-1 from the register, and provide a result to LSB-2 of the register. Other hashing mechanism might also be used.

Although the system 300 of FIG. 3 has been depicted as a collection of connected modules, implying hardware, it should be understood that portions of the system may be enabled as coded instructions, stored in memory, and enabled using microprocessors or logic-coded state machines.

FUNCTIONAL DESCRIPTION

In deeply pipelined processors, successful dynamic branch prediction is crucial to high speed operation. Consequently, a number of branch prediction mechanisms have been developed. One specific mechanism is the Gshare branch prediction mechanism in which a vector is created which captures the outcome of a fixed number of branches that have been executed immediately before the current instruction fetch. This vector is typically created by shifting a logic 1 or logic 0 into the last position of a shift register when the outcome of a given branch is determined, with a logic 1 representing a branch "taken" outcome and a logic 0 representing a branch "not taken" outcome. The bits of the vector are then bitwise XOR'd with appropriate bits of the current branch instruction address. The resulting address is used to index into a branch history table entry, which typically is a counter that maintains a value used for making the prediction ("taken"/"not taken") for the branch.

In the example implementation of FIG. 4A, the low order 2 bits of the branch address are used in the update of the GHR. The update is formed by left shifting the GHR one bit position, Exclusive-ORing the next least significant bit (LSB-1) into the LSB-1 position of the GHR, and XORing the least significant bit of the address into the LSB bit of the GHR. It will be appreciated that the choice of which bits of the address of the branch, and how the hashing is done (e.g., XOR), are only one way in which the update can be realized. Other choices can be made for these parameters.

The principle advantage of updating the GHR only on "taken" branches is that it insures that the BHT index is correct for all instructions in flight behind any branches which are predicted "not taken". This feature is especially important in highly-pipelined and/or superscalar architectures in which the fetch-to-decode delay is greater than one clock cycle.

FIG. 5 is a flowchart illustrating a method for updating a global history prediction record in a microprocessor system using pipelined instruction processing. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 500.

Step 502 accepts a first microprocessor instruction of consecutive operations, including a first conditional branch operation with an associated first branch address, at a first stage in a pipelined microprocessor execution process. Step 504 accesses a current value from a global history record of conditional branch resolutions and predictions. Step 506 hashes the current global history record value with the first branch address, creating a first hash result. In one aspect, Step 506 performs an exclusive-OR operation between a number representing the current GHR value and a number representing the first branch address.

Step 508 uses the first hash result to access an indexed branch history table of branch direction counts. In one aspect, using the first hash result to access the indexed BHT in Step 508 includes indexing a count of the n-most recent first branch resolutions. In another aspect, Step 508 indexes a BHT that indicates a degree of confidence in the assumption that the first branch is "taken".

Step 510 uses the BHT to make a first branch prediction. In response to the first branch prediction being "taken", Step 512 left-shifts the current GHR value. Step 514 hashes the left-shifted GHR with the first branch address, creating a second hash result. Step 516 uses the second hash result to create an updated GHR. Step 518 updates the BHT with a count associated with the first branch resolution. In response to the first branch prediction being resolved as "not taken", Step 520 flushes subsequently accepted microprocessor instructions processed in dependence upon the first branch prediction being "taken". Alternately, Step 520 flushes subsequently accepted microprocessor instructions processed in dependence upon the first branch prediction being "not taken", but resolved as "taken".

In one aspect, accepting the first microprocessor instruction of consecutive operations at the first stage in the pipelined microprocessor execution process (Step 502) includes accepting the first microprocessor instruction at a fetch stage. Then, accessing the GHR in Step 508 includes accessing a speculative GHS (SGHR), and Step 516 creates an updated SGHR. Alternately, Step 502 accepts the first microprocessor instruction at a branch resolution stage, Step 508 accesses a non-speculative GHS, and Step 516 creates an updated non-speculative GHR.

In another aspect, creating the second hash result in Step 514 includes performing an XOR operation between a number representing the left-shifted global history record and a number representing the first branch address. More explicitly, Step 514 includes the following substeps. Step 514a replaces the least significant bit (LSB) of the left-shifted GHR with a first value. Step 514b XORs the first value with the m least significant bits of the first branch address, creating the first result. Step 514c replaces the m LSBs of the left-shifted GHR with the first result.

In one aspect, accepting the first microprocessor instruction of consecutive operations in Step 502 includes accepting the first conditional branch operation with a static prediction bit. Then, making the first branch prediction using the BHT (Step 510) includes: comparing the first branch prediction with the static prediction bit; if the first branch prediction agrees with the static prediction bit, using the static prediction bit as the first branch prediction; and, if the first branch prediction disagrees with the static prediction bit, using a static prediction bit opposite value as the first branch prediction.

A system and method have been presented for updating a global history prediction record in a microprocessor pipeline using "taken" branch predictions. Examples have been given to illustrate the invention. However, the invention is not limited to merely these examples. It should also be appreciated that the specific details of the pipeline given are for illustrative purposes only. The technique of updating the GHR can be used in other pipeline architectures, including but not limited to: out-of-order execution and parallel or "superscalar" architectures.

We claim:

1. In a microprocessor system using pipelined instruction processing, a method for updating a global history prediction record, the method comprising:
    accepting a first microprocessor instruction of consecutive operations, including a first conditional branch operation with an associated first branch address, at a first stage in a pipelined microprocessor execution process;
    accessing a current value from a global history record (GHR) of conditional branch resolutions and predictions;
    hashing the current global history record value with the first branch address, creating a first hash result;
    using the first hash result to access an indexed branch history table (BHT) of branch direction counts;
    using the BHT, making a first branch prediction;
    only in response to the first branch prediction being "taken", left-shifting the current GHR value;
    hashing the left-shifted GHR with the first branch address, creating a second hash result; and,
    supplying the second hash result from a register to the GHR as an updated GHR value.

2. The method of claim 1 wherein accepting the first microprocessor instruction of consecutive operations at the first stage in the pipelined microprocessor execution process includes accepting the first microprocessor instruction at a fetch stage;
    wherein accessing the GHR includes accessing a speculative GHR (SGHR) when the first microprocessor instruction is fetched; and,
    wherein creating the updated GHR includes creating an updated SGHR.

3. The method of claim 1 wherein accepting the first microprocessor instruction of consecutive operations at the first stage in the pipelined microprocessor execution process includes accepting the first microprocessor instruction at a branch resolution stage;
    wherein accessing the GHR includes accessing a non-speculative GHR when the first microprocessor instruction is executed; and,
    wherein creating the updated GHR includes creating an updated non-speculative GHR.

4. The method of claim 1 further comprising:
    flushing subsequently accepted microprocessor instructions processed in dependence upon a first branch prediction selected from a group consisting of a "taken" prediction resolved as "not taken" and a "not taken" prediction resolved as "taken".

5. The method of claim 1 wherein creating the first hash result includes performing an exclusive-OR (XOR) operation between bits representing the current global history record value and bits representing the first branch address.

6. The method of claim 1 wherein creating the second hash result includes performing an XOR operation between bits representing the left-shifted global history record and bits representing the first branch address.

7. The method of claim 6 wherein performing the XOR operation between the bits representing the left-shifted global history record and the bits representing the first branch address includes:
replacing the least significant bit (LSB) of the left-shifted GHR with a first value;
XORing the first value with the m least significant bits of the first branch address, creating the first result; and,
replacing the m LSBs of the left-shifted GHR with the first result.

8. The method of claim 7 further comprising:
updating the BHT with a count associated with the first branch resolution.

9. The method of claim 1 wherein using the first hash result to index the BHT includes indexing a count of the n-most recent first branch resolutions.

10. The method of claim 9 wherein using the first hash result to index the BHT of previous branch direction counts includes indexing a BHT indicating a degree of confidence in the assumption that the first branch is "taken".

11. The method of claim 1 wherein accepting the first microprocessor instruction of consecutive operations includes accepting the first conditional branch operation with a static prediction bit;
wherein making the first branch prediction using the BHT includes:
comparing the first branch prediction with the static prediction bit;
if the first branch prediction agrees with the static prediction bit, using the static prediction bit as the first branch prediction; and,
if the first branch prediction disagrees with the static prediction bit, using a static prediction bit opposite value as the first branch prediction.

12. A pipelined instruction microprocessor system with a global history prediction record, the system comprising:
a pipeline including a plurality of sequential stages for parallel processing microprocessor instructions, each microprocessor instruction including a plurality of consecutive operations, the pipeline including a first stage for processing a first conditional branch operation from a first microprocessor instruction;
a hardware sequencer with an interface for accessing the pipelined stages and processing the operations;
a first address register containing a first branch address associated with the first conditional branch operation;
a global history record (GHR) having an output to supply a current GHR value associated with a history of conditional branch resolutions and predictions;
a first hashing circuit having an input to accept the current GHR value, an input to accept the first branch address, and an output to provide a first hash result;
a branch history table (BHT) having an input to accept the first hash result, the BHT indexing a first branch direction counter associated with the first hash result and providing a first branch prediction;
a second hashing circuit having a register to accept the current GHR value only in response to a first branch prediction of "taken", left-shifting the current GHR value, hashing the left-shifted GHR with the first branch address to create a second hash result, and supplying the second hash result to the GHR as an updated GHR value.

13. The system of claim 12 wherein the pipeline accepts the first microprocessor instruction at a fetch stage; and,
wherein the GHR is a speculative GHR (SGHR) that is accessed when the first microprocessor instruction is fetched.

14. The system of claim 12 wherein the pipeline accepts the first microprocessor instruction at a branch resolution stage; and,
wherein the GHR is a non-speculative GHR that is accessed when the first microprocessor instruction is executed.

15. The system of claim 12 wherein the pipeline accepts the first microprocessor instruction at an execute stage, resolves the first branch prediction, and flushes microprocessor instructions accepted subsequent to the first microprocessor instruction, processed in dependence upon a first branch prediction selected from a group consisting of a "taken" prediction resolved as "not taken" and a "not taken" prediction resolved as "taken".

16. The system of claim 12 wherein the first hash circuit performs an exclusive-OR (XOR) operation between bits representing the current GHR value and bits representing the first branch address.

17. The system of claim 12 wherein the second hash circuit performs an XOR operation between bits representing the left-shifted global history record and bits representing the first branch address.

18. The system of claim 17 wherein the second hash circuit left shifts the current GHR value in the register, replaces the least significant bit (LSB) with a first value, XORs the first value with the m LSBs of the first branch address to create a first result, and replaces the m LSBs in the register with the first result to create the updated GHR.

19. The system of claim 12 wherein the BHT includes a count of the n-most recent first branch resolutions.

20. The system of claim 19 wherein the BHT is updated with a count associated with the first branch resolution.

21. The system of claim 12 wherein BHT supplies the first branch prediction indicating a degree of confidence in the assumption that the first branch is "taken".

22. The system of claim 12 wherein the first stage of the pipeline processes a first conditional branch operation having a static prediction bit; and,
wherein the BHT compares the first branch prediction with the static prediction bit, the BHT using the static prediction bit as the first branch prediction if the first branch prediction agrees with the static prediction bit, and the BHT using a static prediction bit opposite value as the first branch prediction if the first branch prediction disagrees with the static prediction bit.

* * * * *